(12) United States Patent
Taylor

(10) Patent No.: US 7,249,399 B2
(45) Date of Patent: Jul. 31, 2007

(54) CARGO SECURING SYSTEMS FOR CARGO BED

(76) Inventor: Terry Taylor, 7303 Goodman Rd., Walls, MS (US) 38680

( * ) Notice: Subject to any disclaimer, the term of this patent is extended or adjusted under 35 U.S.C. 154(b) by 113 days.

(21) Appl. No.: 10/911,498

(22) Filed: Aug. 5, 2004

(65) Prior Publication Data

US 2006/0026806 A1    Feb. 9, 2006

(51) Int. Cl.
*A44B 21/00*    (2006.01)
(52) U.S. Cl. .............. 24/505; 24/499; 24/502; 24/513; 24/517; 294/106
(58) Field of Classification Search ............... 24/489, 24/495, 499–505, 507–511, 521, 514–518; 248/228.4, 228.6, 230.4, 230.6, 231.51, 231.81, 248/289.11, 289.31, 291.1, 292.11, 292.13, 248/316.1, 316.5; 269/95, 143, 156, 249; 294/100, 104, 106, 110.1, 110.2, 116–118; 29/257, 270, 276, 278
See application file for complete search history.

(56) References Cited

U.S. PATENT DOCUMENTS

| | | | | | |
|---|---|---|---|---|---|
| 227,210 | A | * | 5/1880 | Black | 269/89 |
| 483,963 | A | * | 10/1892 | Leger | 211/37 |
| 566,947 | A | * | 9/1896 | Voise | 24/515 |
| 815,907 | A | * | 3/1906 | Davis | 24/514 |
| 1,070,043 | A | * | 8/1913 | Lake | 24/515 |
| 1,571,332 | A | * | 2/1926 | Herminghausen | 294/86.27 |
| 2,269,790 | A | * | 1/1942 | Sherrill | 24/132 R |
| 2,850,926 | A | * | 9/1958 | Jobe | 269/234 |
| 3,014,258 | A | * | 12/1961 | Pearl | 24/514 |
| 3,308,831 | A | * | 3/1967 | Kritske | 24/67.1 |
| 3,512,380 | A | * | 5/1970 | Winter | 24/514 |
| 3,891,093 | A | * | 6/1975 | Petrie | 24/67.1 |
| 3,896,526 | A | * | 7/1975 | Joiner | 24/67.1 |
| 3,955,249 | A | * | 5/1976 | Shiozaki | 24/503 |
| 4,396,324 | A | | 8/1983 | Ellis | |
| 4,588,222 | A | * | 5/1986 | Martin | 294/16 |
| 4,717,298 | A | | 1/1988 | Bott | |
| 4,850,769 | A | | 7/1989 | Matthews | |
| 4,969,784 | A | | 11/1990 | Yanke | |
| 5,457,857 | A | * | 10/1995 | Lam | 24/503 |
| 5,494,388 | A | | 2/1996 | Stevens | |
| 5,689,864 | A | | 11/1997 | White | |
| 6,176,657 | B1 | | 1/2001 | Romph | |
| 6,511,270 | B1 | | 1/2003 | Burke et al. | |

\* cited by examiner

*Primary Examiner*—Robert J. Sandy
*Assistant Examiner*—Ruth C. Rodriguez
(74) *Attorney, Agent, or Firm*—Blank Rome LLP

(57) ABSTRACT

The present invention relates generally to restraint systems for cargo on cargo transporting vehicles, such as trucks, having designated cargo-carrying space. In particularly, the present invention relates to a system for restraining cargo in the bed of a truck, such as a pick-up truck, or the like; or the interior load-carrying compartment of a van or station wagon. The restraint system contains clamp having two opposing members that are attached a pivot point to form a pair of jaws at one end and a topside at the opposing end. The topside is attached to a rotatable device that is rotated to close or open the jaws depending on the direction of rotation. The rotatable device closes the jaws by urging the topside of the opposing members apart to pivotably close the jaws.

30 Claims, 10 Drawing Sheets

24

CARGO SECURING SYSTEMS FOR CARGO BED

FIELD OF THE INVENTION

The present invention relates generally to restraint systems for cargos on transporting vehicles, such as trucks, etc., having designated cargo-carrying space. In particularly, the present invention relates to a system for restraining cargo in the bed of a truck, such as a pick-up truck, or the like; or the interior load-carrying compartment of a van or station wagon.

BACKGROUND OF THE INVENTION

Truck beds are subject to substantial amounts of wear and tear due to the nature of the various types of cargo carried, the lack of care utilized by those placing the cargo in the bed and withdrawing it from the bed, and various environmental effects. Reconstruction of the truck bed is a substantial and costly procedure usually resulting in retirement of the entire vehicle.

Beside wear and tear, transportation of large, unsecured goods or payloads in shipping and transport vehicles such as trucks, vessels and other movable vehicles, also creates a hazard due to object shifting movement during transport. To prevent this hazard, such objects are typically fastened to the walls of the vehicle with straps or ropes, which requires convenient attachment points for both the article transported and on the floor and the wall surface of the transport vehicle. Such strap or rope securing requires multiple fastening points, is tedious, difficult to quickly set up and undo if access to the articles are required. As a result, goods, and especially smaller packages and items are carried unsecured due to the inconvenience of securing the goods.

When a smaller truck, e.g. "pick-up" style truck, is used, the interior floor, or bed, is often lined with a rigidly formed heavy plastic aftermarket bed liner to protect the interior of the truck bed and to add improved aesthetic effects. The most common and least expensive bed liner is a plastic drop-in style that not only protects the truck bed, but is also very light weight. Despite its advantages, the bed liner is often extremely slippery and covers convenient points for anchoring the transported article, discouraging the securing of the goods. Thus, the truck bed liners often exacerbate the pickup truck operators' problems of securing goods, who place a premium on ease of operation while not detracting from the usefulness or esthetics of the aftermarket truck products used. Moreover, movement between the container of a flammable material and the bed liner can generate static electricity which could cause combustion and explosion of flammable material such as from a small gas can, especially in pick-up trucks with enclosed beds.

Various types of cargo restraints have been proposed. U.S. Pat. No. 6,511,270 to Burke et al. discloses a clamp to be placed against cargoes carried in a truck or other vehicle including a corrugated bed liner. The clamp comprises one or more pairs of movable opposing jaws, each pair selectively engaging a rib of the truck bed liner. The clamp jaws are slidebly retained in grooves in a clamp frame, and moved by spirally disposed grooves in a disk rotated by a connected latchable lever to close or open the jaws against the rib of the bed liner. Anchoring apertures can also be included to further secure the cargo with rope or strapping.

U.S. Pat. No. 5,689,864 to White discloses a clamp for securing objects against a structure adjacent to and on either side of a rib of the structure. The clamp contains first and second arms, which are pivotally coupled to one another at a pivot point. The arms define a pair of opposing jaws that engage the rib and a pair of levers extending away from the opposing jaws on either side of the rib. A threaded member cooperating with each lever is rotated towards the structure. An object is positioned between each threaded member and the structure. In this way, the threaded members press the objects securely against the structure as the opposing jaws grip the rib.

U.S. Pat. No. 4,717,298 to Bott discloses a cargo restraint system for the bed of a truck. The restraint system contains at least one primary cargo securing element and cargo securing members clampingly engageable with the primary cargo-securing element. The primary element resembles track and is secured on the bed liner by fasteners. The cargo-securing members, slidable on the track provided by the primary cargo-securing element, are clamped to the primary elements to hold the cargo in place.

Other cargo restraint systems for truck beds, vans, and station wagons generally are limited by the nature of the cargo to be utilized. With pick-up trucks and similar load carrying vehicles, cargo is generally variable in size and a multi-faceted, multi-purpose cargo restraint system is highly valuable. With the ever increasing use of pick-up trucks, vans, station wagons, and the like which also have other day-to-day uses, such as commuting to and from work, for which some aesthetic appeal is desirable, a means of retaining aesthetic appeal in the vehicle used is also significant.

SUMMARY OF THE INVENTION

The present invention provides a clamp for engaging a rib on a standard truck bed liner for securing cargos and transported articles to the truck bed. The clamp contains two opposing members that are attached a pivot point to form a pair of jaws at one end and a topside at the opposing end. The topside is attached to a rotatable device that is rotated to close or open the jaws depending on the direction of rotation. The rotatable device closes the jaws by urging the topsides of the opposing members apart to pivotably close the jaws. Once the clamp is attached to a rib of the bed liner, it serves as a fastening point or a securing point to hold cargos is place. Although application of the clamp to a truck bed liner is disclosed in detail herein, the clamp of the present invention can be used to secure any items to any ribbed structure.

Other objects and advantages of the present invention will become apparent from the following detailed description taken in conjunction with the accompanying drawings.

BRIEF DESCRIPTION OF THE DRAWINGS

The foregoing background and summary, as well as the following detailed description of the drawings, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE PREFERRED EMBODIMENTS

Figure 1:
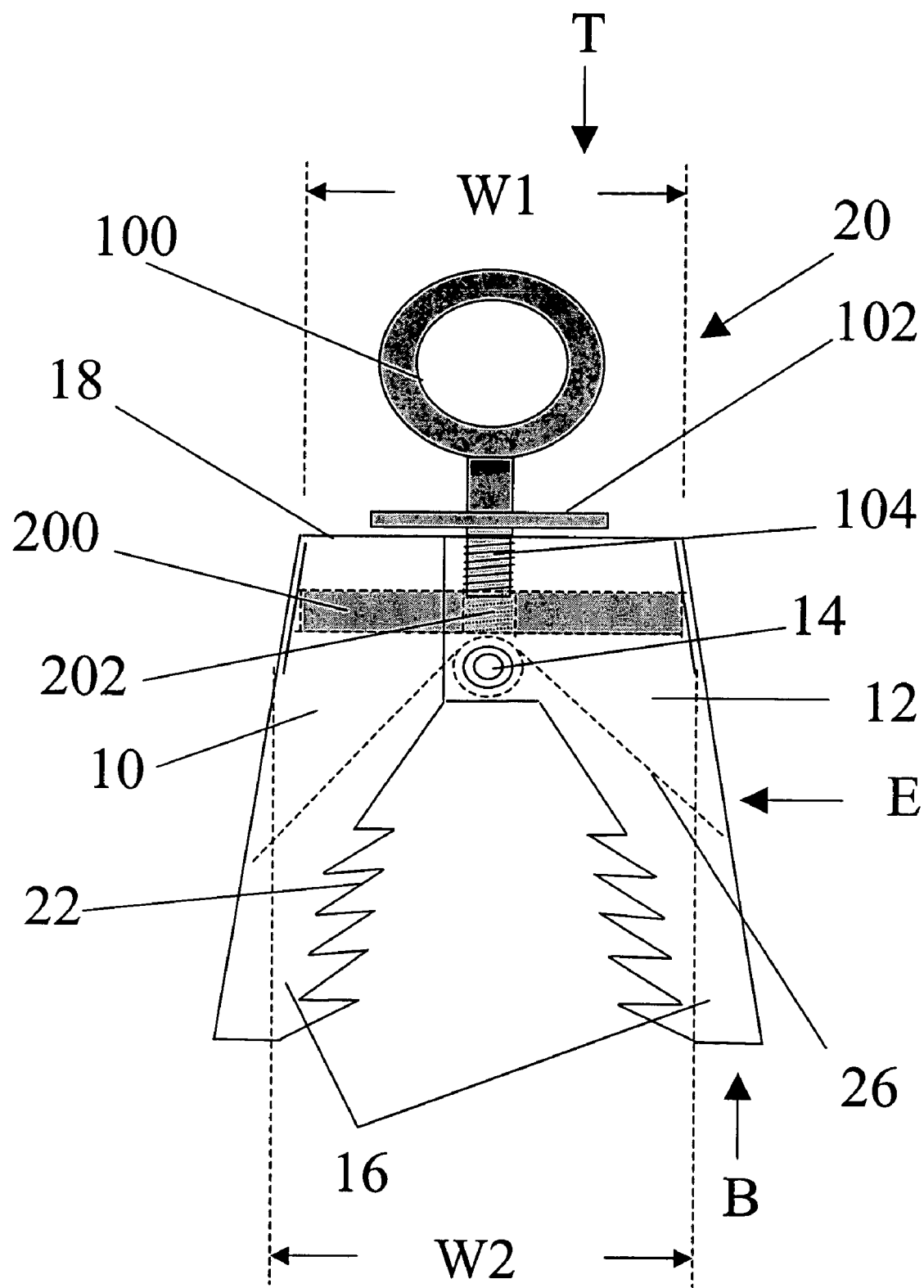
FIG. 1 is a drawing showing the side view of a first embodiment of the clamp.
Figure 2:
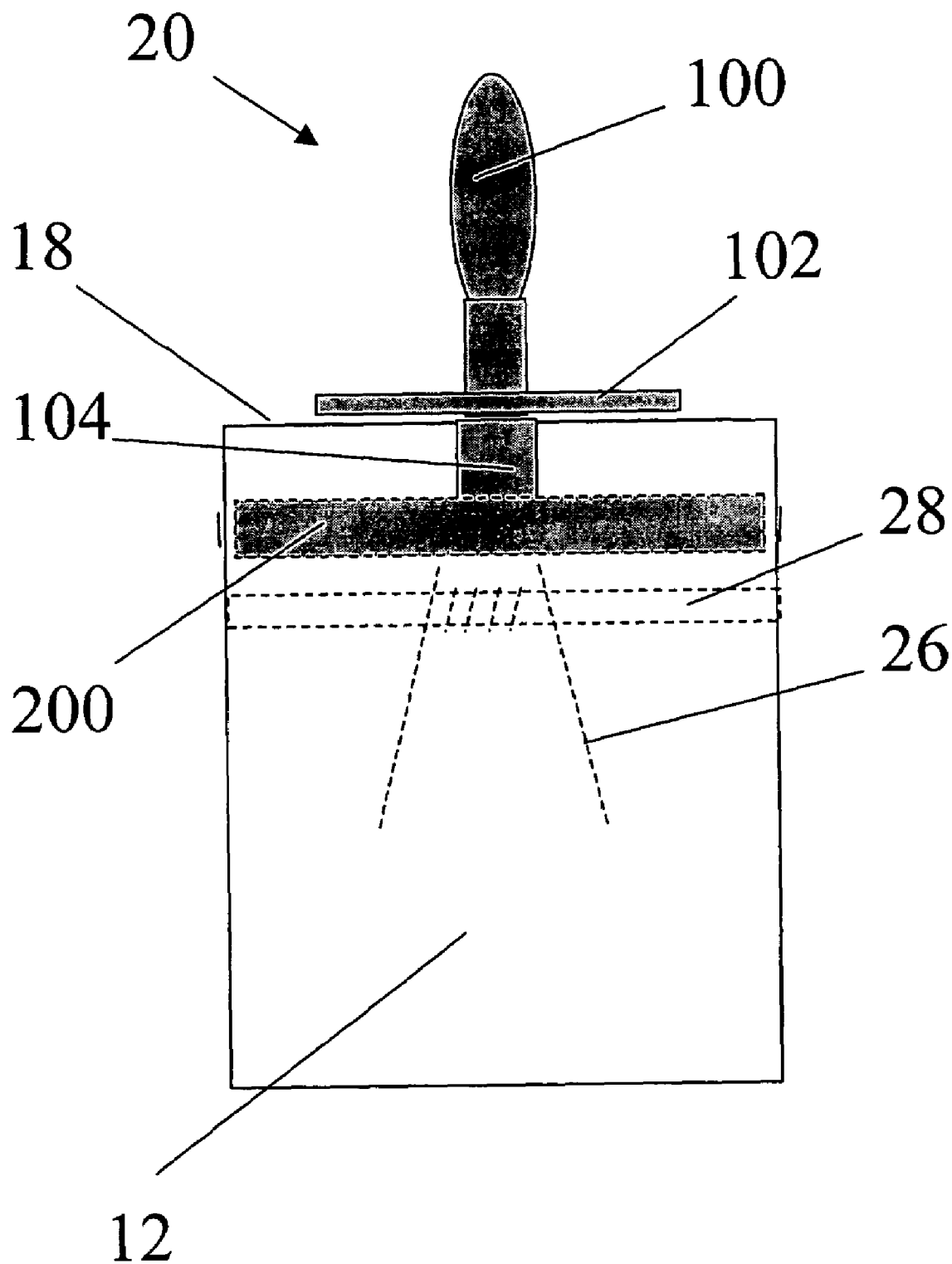
FIG. 2 is a drawing showing the end view (from direction E) of the first embodiment of the clamp.
Figure 3:
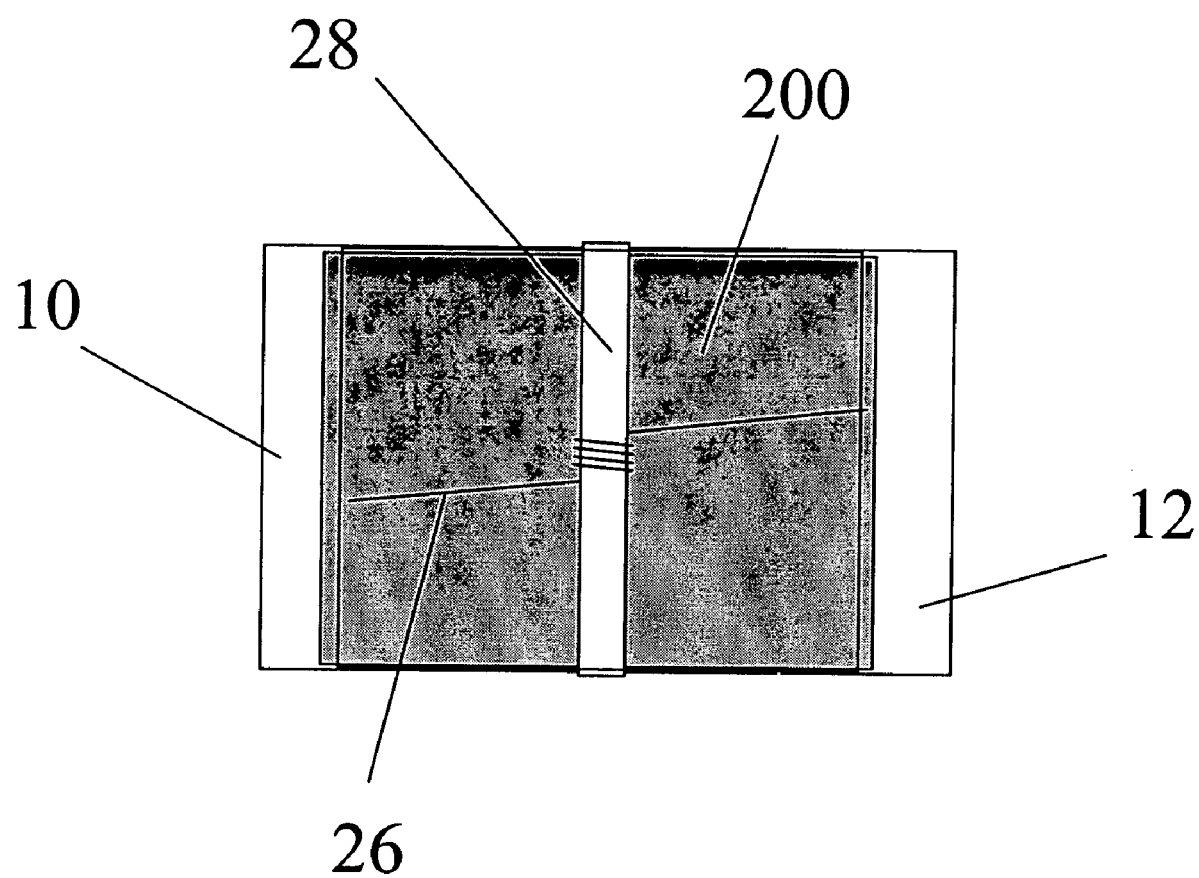
FIG. 3 is a drawing showing the bottom view (from direction B) of the first embodiment of the clamp.
Figure 4:
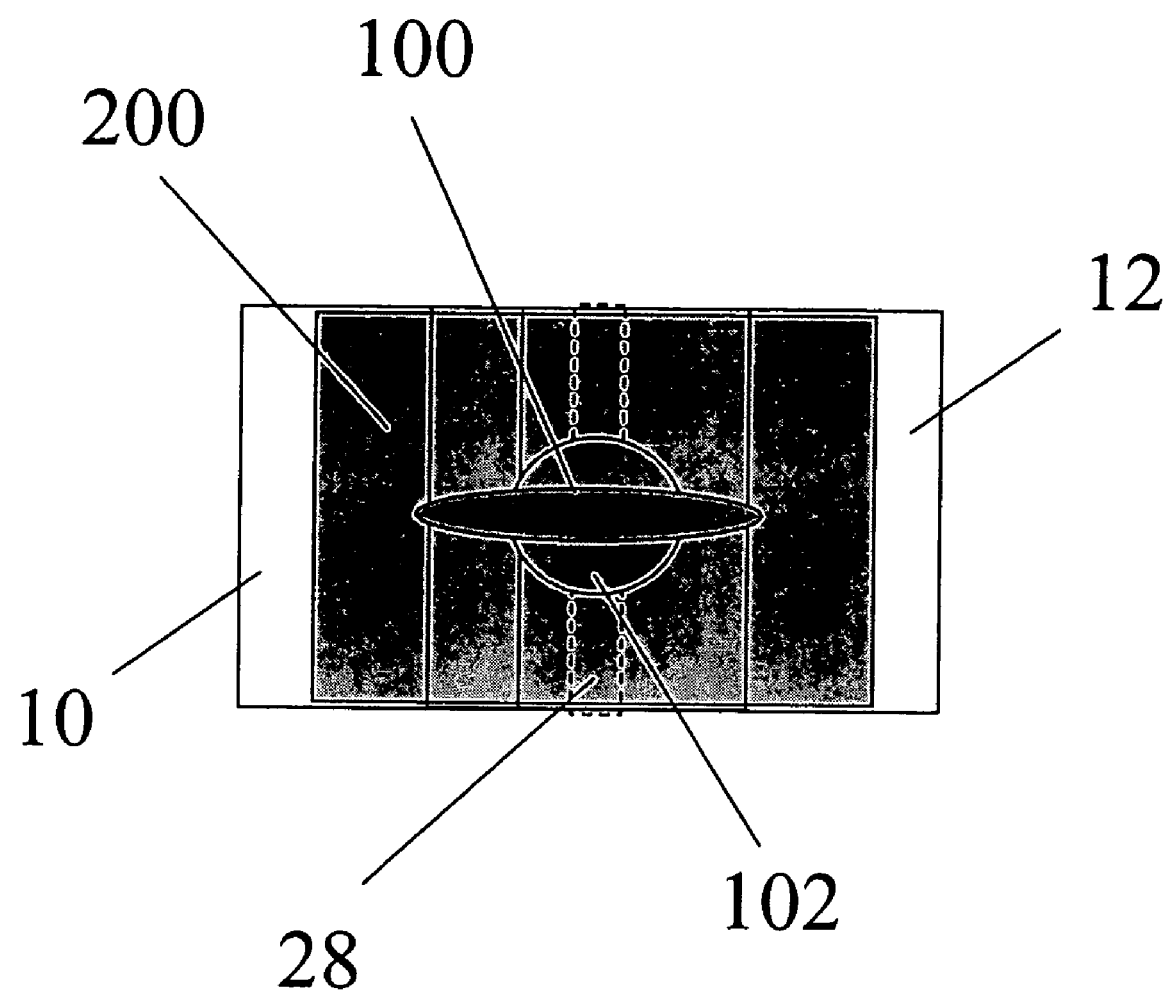
FIG. 4 is a drawing showing the top view (from direction T) of the first embodiment of the clamp.

The bed liner for used with the present invention is preferably set within and secured to the truck bed by suitable fasteners. The liner is shaped to correspond to the shape of the bed and has corresponding sidewalls, forward wall, and floor to cover the bed floor.

The liner is preferably constructed of a moldable polymeric material with suitable wear characteristics to withstand frictional movement of heavy objects thereon and also to withstand piercing by sharp edges or corners of certain objects when moved or disposed on the liner. The liner preferably is corrugated forming grooves and ribs, particularly on the floor of the liner.

FIGS. 1-4 show a first embodiment of the present invention; and FIGS. 6-9 show a second embodiment of the present invention. The clamp contains two opposing members (10 and 12) that are attached at a pivot (14) to form a pair of jaws (16) at one end and a topside (18) at the opposing end. The pivot (14) preferably locates between the jaws (16) and the topside (18) so that when the opposing members (10 and 12) are urged apart at the topside (18), the jaws (16) are forced to come together to close the jaws (16).

The jaws preferably contain teeth (22) that grip the rib (24) of the bed cover. The Figures show four teeth on each jaw; however, any number of teeth is appropriate for the present invention. Preferably the teeth (22) are angled upward toward the topside (18) to better grip the rib (24) upon application of a force that pulls the clamp away from the rib (24).

The topside (18) is attached to a rotatable device (20) that is rotated to close or open the jaws (16) depending on the direction of rotation. The rotatable device (20) closes the jaws by urging the topsides (18) of the opposing members (10 and 12) apart to pivotably close the jaws (16).

Figure 10:
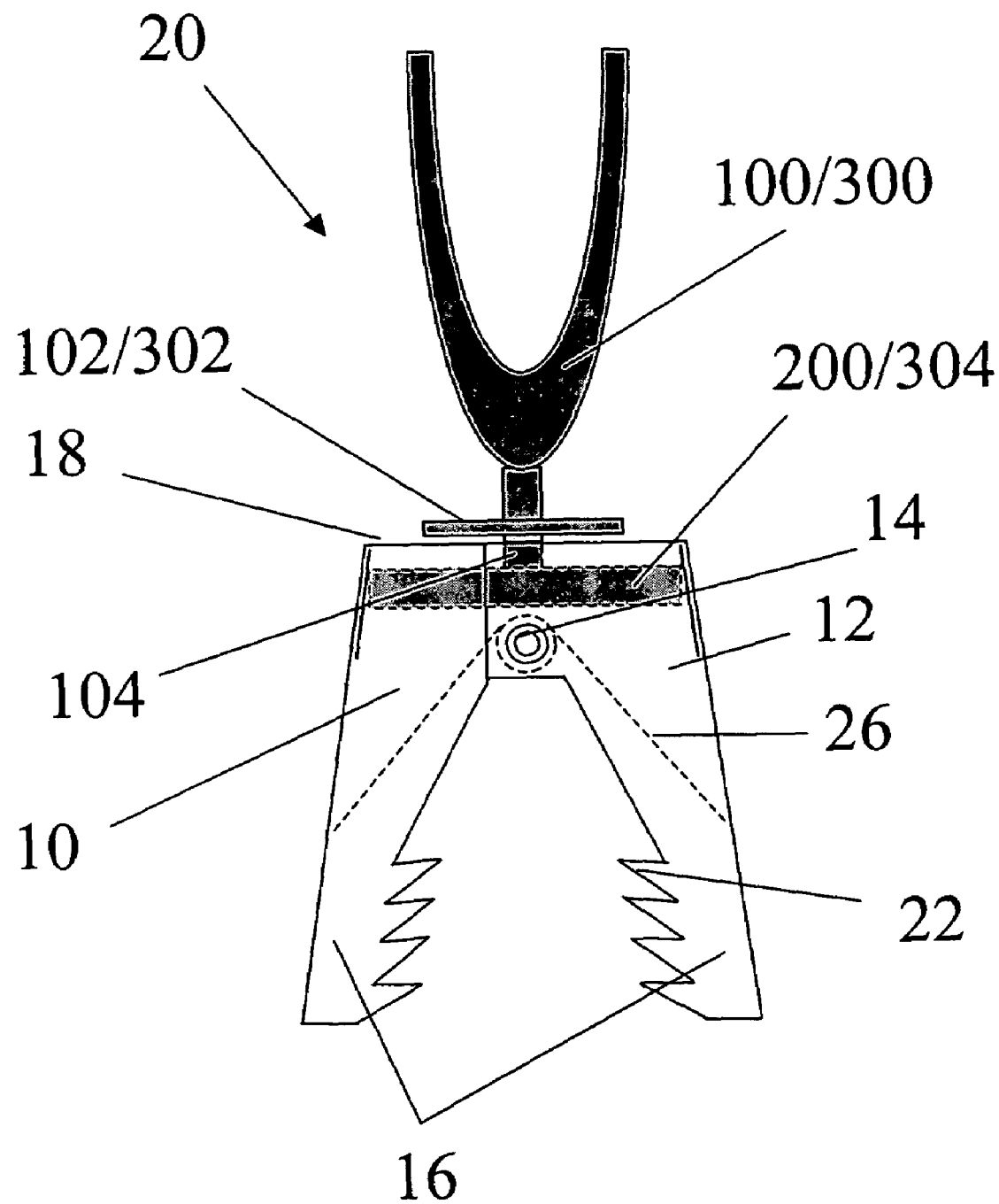
FIG. 10 is a drawing showing a U-shaped upper part of the rotatable device.

In the first embodiment shown in FIGS. 1-4, the rotatable device (20) is connected to a plate (200) which has a dimension longer than the width (W1) at the topside (18) between the two opposing members (10 and 12) (see FIG. 1). The rotatable device (20) contains an upper part (100), a stopper plate (102), and a threaded part (104). The upper part (100) is shown in FIGS. 1-4 as a ring, but can also be of other shapes to facilitate securing of objects and articles to the clamp. In an embodiment depicted in FIG. 10, the upper part (100) can be a U-shaped such that flat sheets, such as glass panels or sheet metals, can be inserted and secured therebetween. For carrying fragile objects or articles, such as glass panels, the U-shaped upper part (100) can also be padded to prevent breakage.

The threaded part (104) engages with and connects to the plate (200) by screwing into a threaded through hole (202) on the plate. To close the jaws (16), the rotatable device (20) is turned to screw the threaded part (104) further into the threaded through hole (202). As a result of the screwing action and the stopper plate (102), the plate (200) rises toward the topside (18), which urges the topsides (18) of the opposing members (10 and 12) apart because the width dimension of the plate (200) is larger than the width W1. This action causes a pivot about the pivot (14) to bring the jaws (16) together. When the jaws engage the rib (24) of the bed cover (FIG. 5), the rotatable device (20) tightens and resists further turning in the tightening direction.

To release the jaws (16) from the rib (24), the rotatable device (20) is turn in the opposite direction to unscrew the threaded part (104) from the threaded through hole (202). This action releases the plate (200) and pushes it away from the topside (18), which relaxes the grip of the jaws (16) against the rib (24). In a preferred embodiment, to facilitate the release of the jaws, a spring (26) is placed between the two opposing members (10 and 12) to urge the jaws (16) apart.

Figure 5:
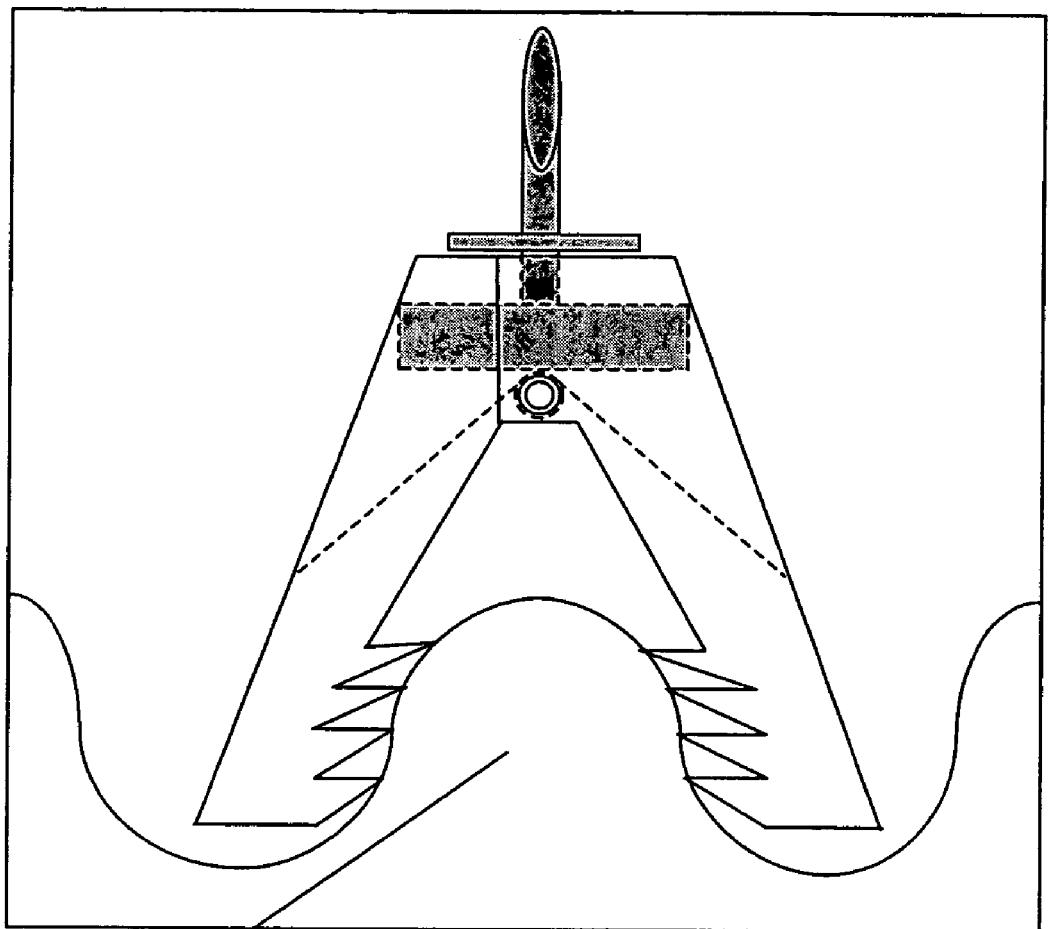
FIG. 5 is a drawing showing the clamp being engaged with a rib of a truck bed cover.
Figure 6:
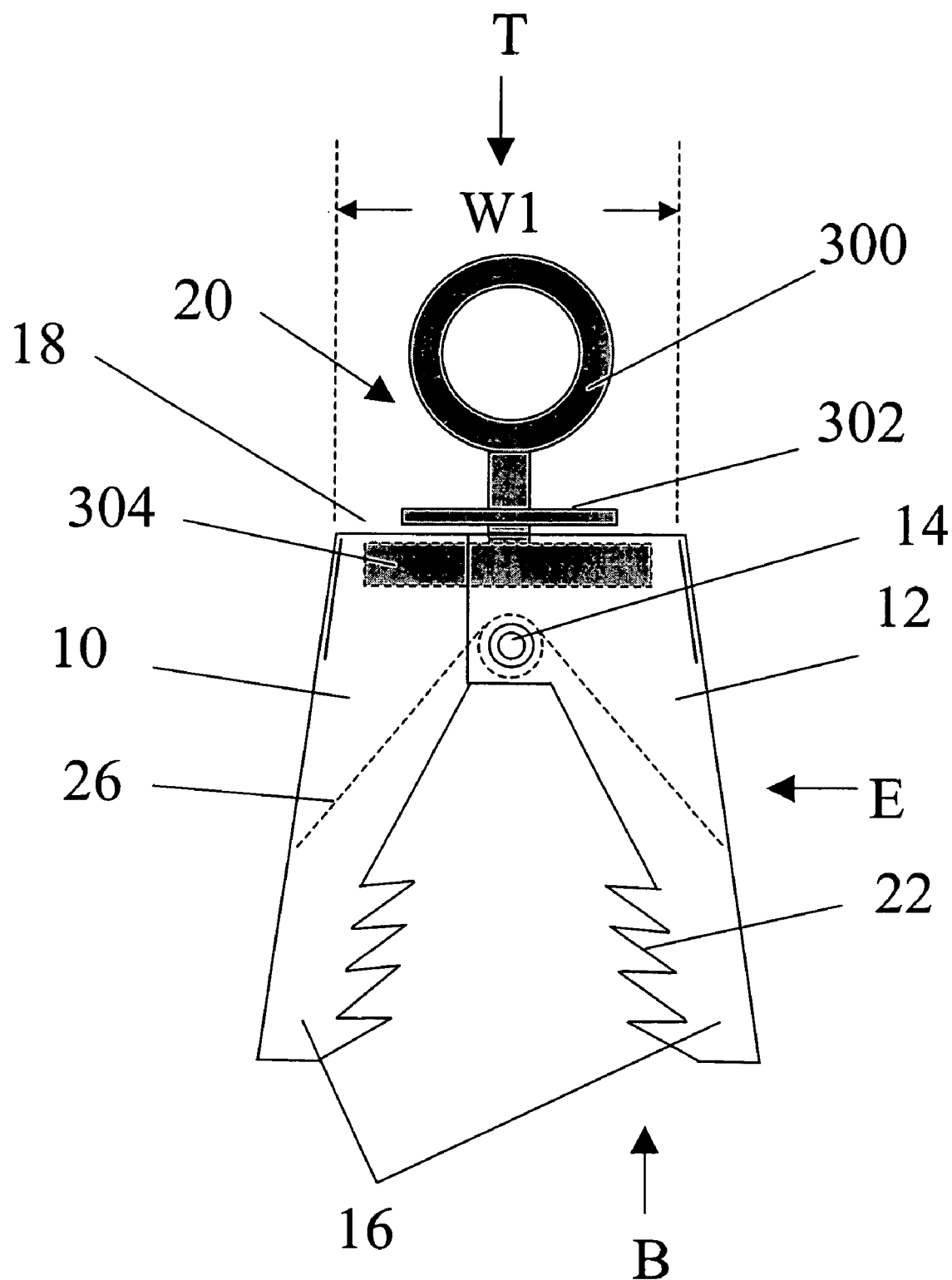
FIG. 6 is a drawing showing the side view of a second embodiment of the clamp.
Figure 7:
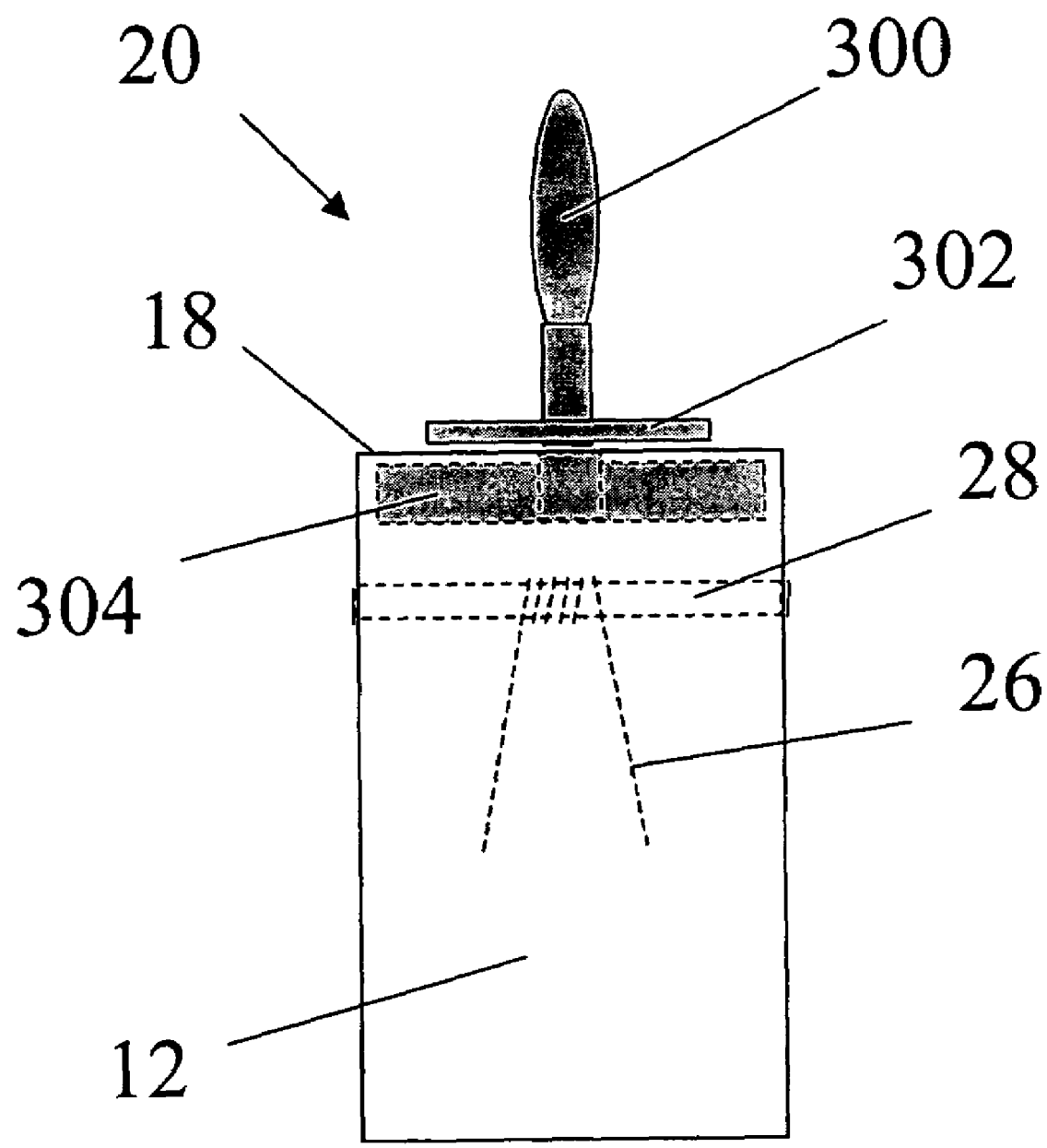
FIG. 7 is a drawing showing the end view (from direction E) of the second embodiment of the clamp.
Figure 8:
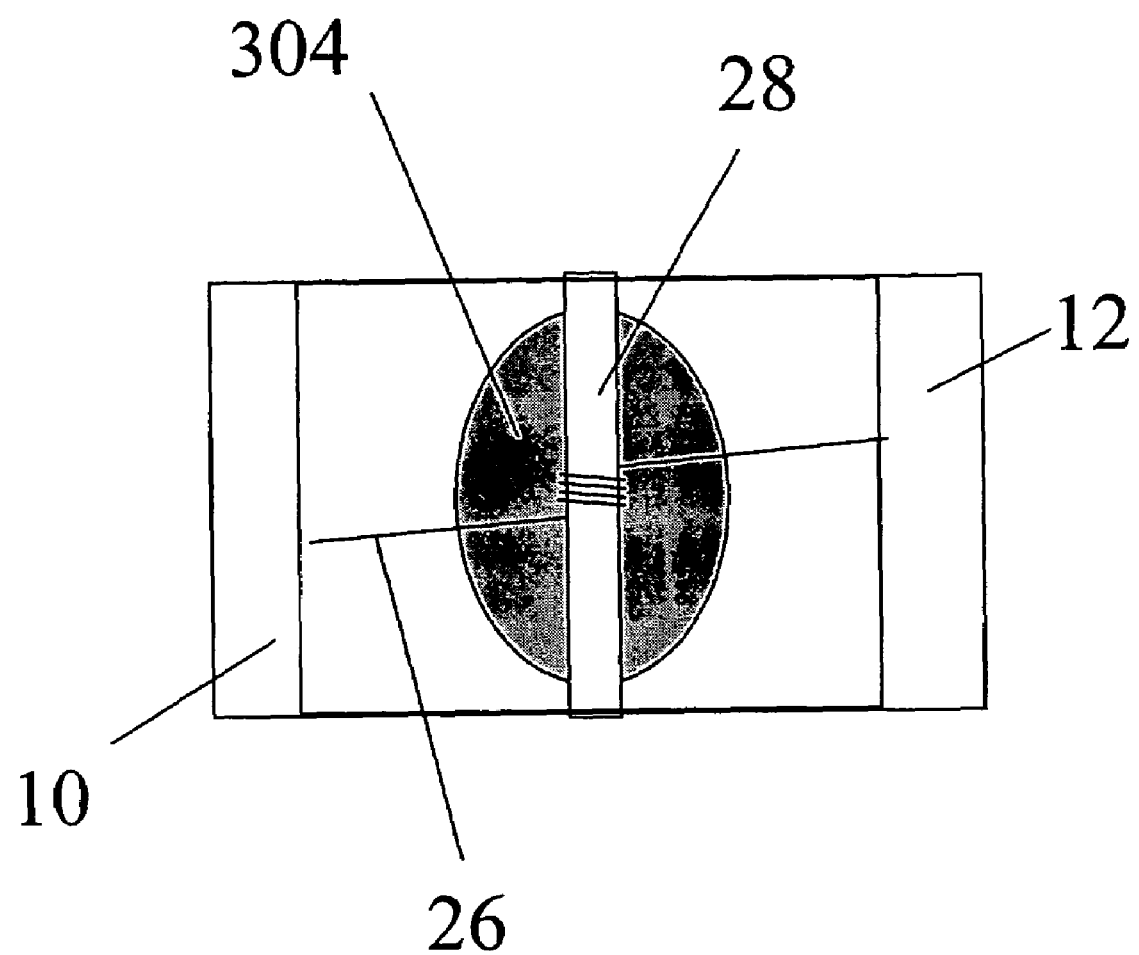
FIG. 8 is a drawing showing the bottom view (from direction B) of the second embodiment of the clamp.
Figure 9:
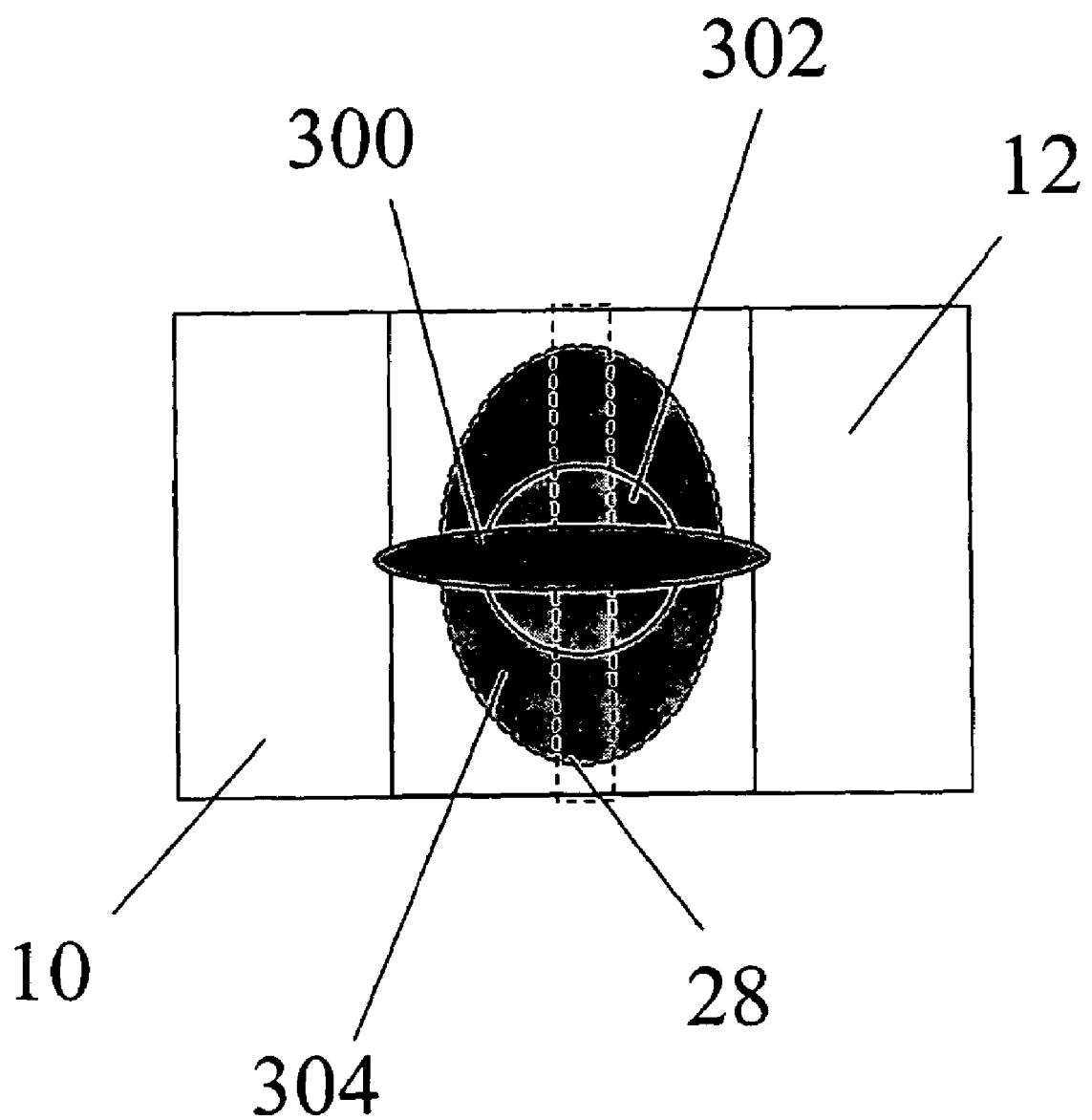
FIG. 9 is a drawing showing the top view (from direction T) of the second embodiment of the clamp.

In the first embodiment, when viewed from the side (FIG. 1), the width (W1) at the topside (18) is preferably smaller than the width (W2) at the pivot point and gradually narrows from the pivot (14) towards the topside (18), as shown in FIG. 5.

In a second embodiment shown in FIGS. 6-10, the clamp has basically the same configuration as that of the first embodiment, except the particular structures of the rotatable device (20). The rotatable device (20) of the second embodiment contains an upper part (300), a stopper plate (302), and a cam (304). The upper part (300) is shown in FIGS. 6-9 as a ring, but can also be of other shapes to facilitate securing of objects and articles to the clamp. In an embodiment depicted in FIG. 10, the upper part (300) can be a U-shaped such that flat sheets, such as glass panels or sheet metals, can be inserted and secured therebetween. For carrying fragile objects or articles, such as glass panels, the U-shaped upper part (300) can also be padded to prevent breakage.

The cam (304) is comparable to the plate (200) of the first embodiment; however, unlike the plate (200), it is permanently integrated with the rest of the rotatable device (20) and is not a separate piece. Therefore, the cam (304) turns with the turning of the upper part (300) of the rotatable device (20). The cam (304) is approximately oval shaped having a longer major axis and a shorter minor axis. The minor axis is shorter than the width (W1) at the topside (18) between the two opposing members (10 and 12) (see FIG. 6), while the major axis is longer than the width (W1) at the topside (18). To close the jaws of the clamp, the rotatable device (20) is turned so that the major axis approximately aligns with the width (W1) and pushes the topsides (18) of the opposing members (10 and 12) apart. This action causes a pivot about the pivot (14) to bring the jaws (16) together. When the jaws engage the rib (24) of the bed cover (FIG. 5), the rotatable device (20) tightens and resists further turning in the tightening direction. Maximum closure of the jaws (16) occurs when the major axis aligns perfectly with the width (W1). In certain situations, however, especially when the rib is relatively large, maximum closure of the jaws (16) is not required to tightly attach the clamp to the rib (24). In those situations, the major axis of the cam (304) does not align perfectly with the width (W1) so long as the jaws (16) grip tightly to the rib (24).

To release the jaws (16) from the rib (24), the rotatable device (20) is turn in the opposite so that the minor axis aligns with the width (W1). This action releases the pressure of the cam (304) against the topsides (18) of the opposing members (10 and 12), which relaxes the grip of the jaws (16) against the rib (24). In a preferred embodiment, to facilitate the release of the jaws, a spring (26) is placed between the two opposing members (10 and 12) to urge the jaws (16) apart.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A cargo clamp comprising
    a first member having a first end and a second end;
    a second member having a first end and a second end and opposing said first member, the first and second members are connected at a pivot point to form a pair of jaws at the respective first ends and a topside at the respective second ends;
    a plate connected to a rotatable device for closing the jaws, wherein the plate is located between the first and second members and the rotatable device is located at the topside; and
    a spring for biasing the jaws in an open position.

2. The cargo clamp of claim 1, wherein the jaws contain teeth.

3. The cargo clamp of claim 1, wherein the rotatable device contains a ring.

4. The cargo clamp of claim 1, wherein the rotatable device contains a u-shaped holder.

5. The cargo clamp of claim 4, wherein the u-shaped holder is padded.

6. The cargo clamp of claim 1, wherein the plate is a substantially oval cam that is permanently connected to the rotatable device.

7. The cargo clamp of claim 6, wherein the oval cam is positioned such that when it is rotated, the major axis of the oval cam urges the second ends of the opposing first and second members apart resulting in closure of the jaws.

8. The cargo clamp of claim 1, wherein the plate contains a threaded hole and connects to the rotatable device through a screw.

9. The cargo claim of claim 8, wherein the plate is positioned such that when the rotatable device is rotated, the plate moves toward the topside or away from the topside; when the plate moves toward the topside it urges the second ends of the opposing first and second members apart resulting in closure of the jaws 10. The cargo clamp of claim 1, wherein the pivot point is located between the topside and the jaws.

11. A method of making a cargo clamp comprising the steps of
    providing a first member having a first end and a second end;
    providing a second member having a first end and a second end;
    connecting said the first and second members in opposing position at a pivot point to form a pair at the respective first ends and a topside at the respective second ends;
    providing a rotatable device connected to a plate for closing the jaws, wherein the plate is located between the first and second members and the rotatable device is located at the topside; and
    providing a spring for biasing the jaws in an open position.

12. The method of claim 11, wherein the jaws contain teeth.

13. The method of claim 11, wherein the rotatable device contains a ring.

14. The method of claim 11, wherein the rotatable device contains a u-shaped holder.

15. The method of claim 14, wherein the u-shaped holder is padded.

16. The method of claim 11, wherein the plate is a substantially oval cam that is permanently connected to the rotatable device.

17. The method of claim 16, wherein the oval cam is positioned such that when it is rotated, the major axis of the oval cam urges the second ends of the opposing first and second members apart resulting in closure of the jaws.

18. The method of claim 11, wherein the plate contains a threaded hole and connects to the rotatable device through a screw.

19. The method of claim 18, wherein the plate is positioned such that when the rotatable device is rotated, the plate moves toward the topside or away from the topside; when the plate moves toward the topside it urges the second ends of the opposing first and second members apart resulting in closure of the jaws 20. The method of claim 11, wherein the pivot point is located between the topside and the jaws.

21. A cargo clamp comprising
    a first member having a first end and a second end;
    a second member having a first end and a second end and opposing said first member, the first and second members are connected at a pivot point to form a pair of jaws at the respective first ends and a topside at the respective second ends;
    a plate connected to a rotatable device for closing the jaws, wherein the plate is located between the pivot point and the topside and the rotatable device is located at the topside; and
    a spring for biasing the jaws in an open position.

22. The cargo clamp of claim 21, wherein the jaws contain teeth.

23. The cargo clamp of claim 21, wherein the rotatable device contains a ring.

24. The cargo clamp of claim 21, wherein the rotatable device contains a u-shaped holder.

25. The cargo clamp of claim 24, wherein the u-shaped holder is padded.

26. The cargo clamp of claim 21, wherein the plate is a substantially oval cam that is permanently connected to the rotatable device.

27. The cargo clamp of claim 26, wherein the oval cam is positioned such that when it is rotated, the major axis of the oval cam urges the second ends of the opposing first and second members apart resulting in closure of the jaws.

28. The cargo clamp of claim 21, wherein the plate contains a threaded hole and connects to the rotatable device through a screw.

29. The cargo claim of claim 28, wherein the plate is positioned such that when the rotatable device is rotated, the plate moves toward the topside or away from the topside; when the plate moves toward the topside it urges the second ends of the opposing first and second members apart resulting in closure of the jaws.

30. The cargo clamp of claim 21, wherein the pivot point is located between the topside and the jaws.

* * * * *